(12) United States Patent
Ardö

(10) Patent No.: US 10,818,017 B2
(45) Date of Patent: Oct. 27, 2020

(54) METHOD AND SYSTEM FOR TRACKING A PLURALITY OF OBJECTS IN A SEQUENCE OF IMAGES

(71) Applicant: Axis AB, Lund (SE)

(72) Inventor: Håkan Ardö, Lund (SE)

(73) Assignee: AXIS AB, Lund (SE)

( * ) Notice: Subject to any disclaimer, the term of this patent is extended or adjusted under 35 U.S.C. 154(b) by 116 days.

(21) Appl. No.: 16/168,037

(22) Filed: Oct. 23, 2018

(65) Prior Publication Data

US 2019/0164300 A1     May 30, 2019

(30) Foreign Application Priority Data

Nov. 30, 2017    (EP) ..................................... 17204646

(51) Int. Cl.
    *G06K 9/00*          (2006.01)
    *G06T 7/246*        (2017.01)
                 (Continued)

(52) U.S. Cl.
CPC .......... *G06T 7/248* (2017.01); *G06K 9/00335* (2013.01); *G06K 9/00771* (2013.01); *G06K 9/6274* (2013.01); *G06T 7/74* (2017.01); *G06T 7/40* (2013.01); *G06T 7/90* (2017.01); *G06T 2207/10016* (2013.01); *G06T 2207/20076* (2013.01); *G06T 2207/20084* (2013.01); *G06T 2207/30236* (2013.01); *G06T 2207/30241* (2013.01)

(58) Field of Classification Search
CPC . G06T 7/248; G06T 7/74; G06T 2207/10016; G06T 2207/20076; G06T 2207/30236; G06T 2207/20084; G06T 2207/30241; G06T 7/90; G06T 7/40; G06K 9/6274; G06K 9/00335; G06K 9/00771
USPC ........................................................ 382/103
See application file for complete search history.

(56) References Cited

U.S. PATENT DOCUMENTS 8,111,873 B2    2/2012   Berthilsson et al.
2006/0215880 A1    9/2006   Berthilsson et al.
(Continued)

OTHER PUBLICATIONS

"Face Detection and Tracking in a Video by Propagating Detection Possibilities", Mikolajczyk, et al., IEEE Transactions on Pattern Analysis and Machine Intelligence, IEEE Computer Society USA, vol. 25, No. 10, Oct. 1, 2003.
(Continued)

*Primary Examiner* — Huy C Ho
(74) *Attorney, Agent, or Firm* — Volpe and Koenig

(57) ABSTRACT

There is provided a method and system for tracking a plurality of objects in a sequence of images. The method comprises: receiving an image from a sequence of images; calculating, based on the received image, a detection probability map which, for each state of a predefined set of states of an object, specifies a probability that any of the plurality of objects is detected in that state in the received image; updating, based on the calculated detection probability map, an object identity map and an accumulated probability map recursively from a previous object identity map and a previous accumulated probability map corresponding to a previously received image of the sequence of images, and tracking each object in the received image based on the updated object identity map and the updated accumulated probability map.

15 Claims, 3 Drawing Sheets

(51) Int. Cl.
*G06T 7/73* (2017.01)
*G06K 9/62* (2006.01)
*G06T 7/40* (2017.01)
*G06T 7/90* (2017.01)

(56) References Cited

U.S. PATENT DOCUMENTS

| | | |
|---|---|---|
| 2009/0296985 A1* | 12/2009 | Lv ................. G06T 7/285 382/103 |
| 2011/0169917 A1 | 7/2011 | Stephen et al. |
| 2012/0148102 A1* | 6/2012 | Moriguchi ........... G06T 7/277 382/103 |
| 2013/0054142 A1 | 2/2013 | Moriguchi et al. |
| 2014/0379296 A1 | 12/2014 | Nathan et al. |

OTHER PUBLICATIONS

"A Deep Convolutional Neural Network for Background Subtraction", Babaee et al., Arxiv.org, Cornell University Library, 201 Olin Library Cornell University Ithaca, NY 14853, Feb. 6, 2017.

"Off-Line Multiple Object Tracking Using Candidate Selection and the Viterbi Algorithm", Pitie et al., Image Processing, 2005, ICIP 2005, IEEE International Conference ON, vol. 3, Sep. 11, 2005.
"Multi-Target Tracking Using On-Line Viterbi Optimisation and Stochastic Modelling", Ardö, Jan. 1, 2009.
"A CNN-Based Cow Interaction Watchdog", Ardö, Sep. 30, 2016.
"A CNN-Based Cow Interaction Watchdog", Ardö, IET Research Journals.
European Search Report for European Patent Appln. No. 17204646.8 dated May 24, 2018.
Andriyenko et al., "Globally Optimal Multi-target Tracking on a Hexagonal Lattice," In: Daniilidis K., Maragos P., Paragios N. (eds) Computer Vision—ECCV 2010. ECCV 2010. Lecture Notes in Computer Science, vol. 6311. Springer, Berlin, Heidelberg (2010).
Fleuret et al., "Multicamera People Tracking with a Probabilistic Occupancy Map," in IEEE Transactions on Pattern Analysis and Machine Intelligence, vol. 30, No. 2, pp. 267-282 (Feb. 2008).
Communication pursuant to Article 94(3) EPC dated Aug. 19, 2019 for the European Patent Application No. 17204646.8.

* cited by examiner

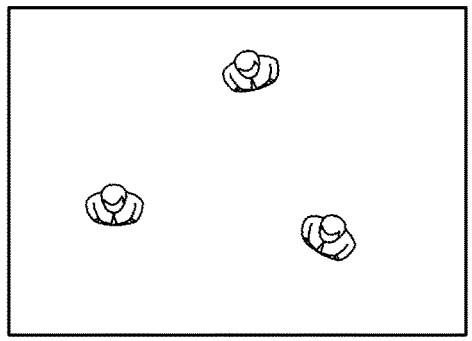
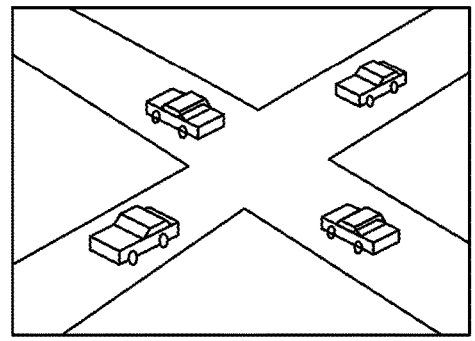
Fig. 1a Fig. 1b
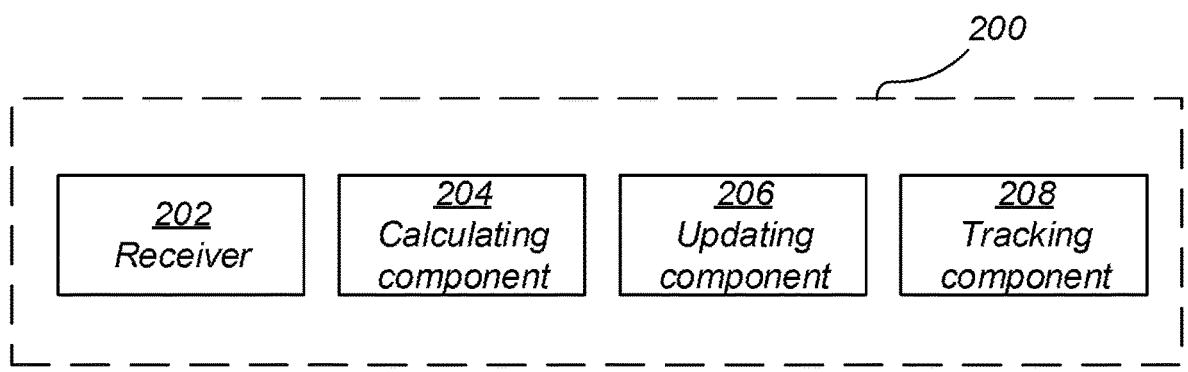
Fig. 2

METHOD AND SYSTEM FOR TRACKING A PLURALITY OF OBJECTS IN A SEQUENCE OF IMAGES

TECHNICAL FIELD

The present invention relates to the field of tracking of objects in a video. In particular, it relates to a method and a system for tracking a plurality of objects in a sequence of images.

BACKGROUND

In video surveillance, it is often of interest to automatically track objects in a static background from a video sequence captured by a video camera. In such applications, a state space model may be used to model the possible states that the objects may be in. For example, the states may correspond to the possible locations that the objects may have. The state space model may further be augmented by a probabilistic motion model which describes how the state of an object is allowed to move from one frame to the next of the video sequence. To exemplify, in the case that only a first object is to be tracked, the state space may be defined by a set of n locations describing possible locations of the first object. The so defined state space thus has n states. When a first and a second object are to be tracked, each state defines a location, among the n possible locations, of the first object, and a location, among the n possible locations, of the second object. For two objects, the state space will thus have $n^2$ states. Generally, if k objects are to be tracked, the corresponding state space will have $n^k$ states. Accordingly, the dimensionality of the state space grows quickly with the number of objects that are to be tracked.

When tracking the objects in the video sequence, the problem is to find the most likely sequence of states of the objects that results in the observed video sequence. A known algorithm solving this problem is the so-called Viterbi algorithm. In the context of tracking objects in a video sequence, the Viterbi algorithm was further explored in the PhD thesis by Håkan Ardö, "Multi-target Tracking Using on-line Viterbi Optimisation and Stochastic Modelling", Centre for Mathematical Sciences, Lund University, 2009, ISBN 978-628-7685-2. In brief, the Viterbi algorithm is a computational scheme for recursively updating, for each state and each observed video frame, the joint probability that the plurality of objects is in that state in the video frame. The methodology presented in that thesis may be computationally feasible for tracking one or a few objects. However, as the number of objects increases, the state space grows exponentially as explained above. This causes the computational burden to be infeasible in many applications, e.g., if the computations are to be carried out in the camera itself. There is thus room for improvements.

SUMMARY

The above problems are mitigated and a way of tracking a plurality of objects in a sequence of images which is more computationally efficient is set forth by a method of tracking a plurality of objects in a sequence of images, comprising:
receiving an image from a sequence of images,
calculating, based on the received image, a detection probability map which, for each state of a predefined set of states of an object, specifies a probability that any of the plurality of objects is detected in that state in the received image, updating, based on the calculated detection probability map, an object identity map and an accumulated probability map recursively from a previous object identity map and a previous accumulated probability map corresponding to a previously received image of the sequence of images, wherein, for each state of the predefined set of states, the object identity map identifies an object which is most likely to be in that state in the received image, and, the accumulated probability map specifies a probability of an object, which is identified in the object identity map for that state, having that state in the received image, and tracking each object in the received image based on the updated object identity map and the updated accumulated probability map.

As explained above, the tracking of a plurality of objects becomes computationally demanding because of the size of the state space increasing exponentially with the number of objects to be tracked. In order to reduce the computational burden, the teachings herein propose a state space model of reduced dimensionality which approximates the full state space model. More specifically, the proposed state space model is defined with respect to a predefined set of states. The predefined set of states corresponds to the set of possible states of one object. Thus, if an object has n possible states, the predefined set of states comprises those n states. In this way, the state space model has the same number of states regardless of the number of objects. To deal with the fact that there is a plurality of objects, the state space model is associated with an object identity map. The object identity map identifies, for each state of the predefined set of states, an object which is currently most likely to be in that state. Using such an object identity map together with the simplified state space model thus makes it possible to significantly reduce the dimensionality of the problem, thereby reducing the required computational effort. Specifically, instead of recursively updating joint probabilities that k objects are in a k-dimensional state (as required in the prior art where a full state space model is used), it is enough to recursively update a marginal probability that one object, as identified by the object identity map, is in a one-dimensional state.

A detection probability map, an object identity map, and an accumulated probability map, as used herein, are maps which are defined with respect to a set of grid points, or cells, corresponding to the predefined set of states.

For each grid point, i.e., for each state, the detection probability map specifies a probability that any of the plurality of objects is detected, i.e., observed, in that state in a received image. If the states are spatial locations, the probability may be the probability that a center of any of the plurality of objects is detected in the state. The detection probability map does hence not differentiate between the different objects, but specifies the probability any one of the probability of object is detected in each state in the received image. A detection probability map is calculated for each received image and is calculated independently of the detection probability map of previously received images. The detection probability map is hence only dependent on the image data in the currently received image.

The object identity map keeps track of which object is most likely to be in each state at each point in time, i.e., for each received image. More specifically, for a currently received image and for each grid point, i.e., for each state, the object identity map identifies an object which currently is most likely to be in that state.

The accumulated probability map keeps track of, for each state, the probability of the object, which is most likely to be in the state according to the object identity map, actually having that state at each point in time, i.e., for each received image. The object identity map thus associates each state with a most likely object, and the accumulated probability map further associates the most likely object with a probability of being in that state. In order to keep track of the most likely object for each state and the associated probability of being in that state at each point in time, i.e., for each received image, the object identity map and the accumulated probability map are updated recursively from their previous values based on the detection probability map, i.e., based on information on where the objects are detected in the currently received image.

The method may be run in an on-line setting, meaning that the steps of the method may be carried out as soon as a new image is received. In such an on-line setting the tracking of each object in the received image may be done by finding one or more states for which the object is identified in the updated object identity map, and selecting a state among the found one or more states having a highest probability specified in the updated accumulated probability map. This is repeated for each received image.

The method may also be run in an off-line setting, meaning that the steps of the method are carried out with respect to each image of the sequence after all images of the sequence have been received. In such an off-line setting, the tracking of the objects in the sequence of images may be performed by:

1) For each received image, and each state, keeping track of a state in the previous accumulated probability map that gives a maximum value of a product of the probability specified in the previous accumulated probability map and a transition probability (to be described in more detail in the following).
2) For the last image in the sequence, and for each object, finding one or more states for which the object is identified in the updated object identity map, and selecting a state among the found one or more states having a highest probability specified in the updated accumulated probability map.
3) Backtracking each object by starting from the state selected in step 2) and following the track backwards in time to the first image using the states kept track of in step 1). The so formed trajectory is the track of the object.

The method may further be run as an intermediate between the on-line setting and an off-line setting. In such an intermediate setting steps 1)-3) described above are used with the modification that step 2) is carried out not only for the last image but for images in the sequence received at a certain time interval, and the backtracking of step 3) is limited to images in a time window corresponding to that certain time interval. The time interval may be adjusted dynamically.

Accordingly, in each of the on-line, off-line and intermediate settings it holds that for at least one image in the sequence of images, each object in the image may be tracked based on the updated object identity map and the accumulated probability map by finding one or more states for which the object is identified in the updated object identity map, and selecting a state among the found one or more states having a highest probability specified in the updated accumulated probability map.

When updating the accumulated probability map, the Viterbi algorithm cannot be used straight away but needs to be adapted to the special situation with the simplified state space model and the associated object identity map. Further, not only the accumulated probability map needs to be updated, but also the object identity map.

The object identity map may be updated from the previous object identity map and the previous accumulated probability map. Firstly, for each state, a corresponding most likely previous state may be identified. When doing so, a probabilistic motion model that describes how the state of an object is allowed to move from one image to the next in the image sequence is used. Secondly, once the most likely previous state has been identified, the object identity map may be updated to take the value of the previous object identity map for the identified most likely previous state. More specifically, the object identity map may be updated for each state of the predefined set of states by:

identifying a state in the previous accumulated probability map that gives a maximum value of a product of the probability specified in the previous accumulated probability map and a transition probability, wherein the transition probability defines a probability of an object moving from the state in the previous accumulated probability map to the state for which the object identity map currently is updated, and updating the object identity map to identify the same object as the object identified by the previous object identity map for the identified state.

The accumulated probability may be updated by further taking the detection probability map, i.e., the information from the received image, into account. In more detail, the accumulated probability map may be updated by:

for each state of the predefined set of states, calculating a product of the maximum value (of the product of the probability specified in the previous accumulated probability map and a transition probability as described above) and a probability specified by the detection probability map for that state, and normalizing the so formed products over states which are identified as being associated with the same object by the updated object identity map.

The first of these steps propagates the previous accumulated probabilities forward to the current time point. However, the propagated probabilities will no longer sum to one and therefore needs to be normalized. By assuming that the state of the object is one of the states for which it is currently the most likely object (as indicated in the object identity map), a probability distribution may be formed by normalizing the propagated probabilities with respect to those states that are associated with the same object according to the object identity map. This assumption is an approximation which for distant objects are insignificant, but for close objects may affect the results.

By updating the object identity map and the accumulated probability map as explained above, the end result of the tracking of the plurality of objects will be a good approximation to that provided by applying the Viterbi algorithm to the full state space model, albeit the computational complexity is much lower. The only assumption made is that two different objects cannot be in the same state at the same time, which makes sense as the position of an object typically is part of its state.

The transition probability defined above describes how the state of an object is allowed to move from one image to the next. In more detail, the transition probability may be defined by a probability distribution over states at the current time point, corresponding to the currently received image, given the state of the object at the previous time point, corresponding to the previously received image. In principle, any such model could be used. However, in practice, certain movements are more likely than others depending on the application at hand.

For example, the transition probability may be higher for states in the previous accumulated probability map which are within a predefined subset of states compared to states which are outside of said predefined subset of states. In other words, there may be a region of states at the previous time point which are more likely than others to end up at a particular state at the current time point. For example, if the objects are cars driving on a highway with a certain speed limit and the states correspond to possible spatial positions of the cars, there will be a region of positions of the cars at the previous time point from which the cars likely end up at the current position at the current time point. By modelling the transition probabilities in this way, prior information about the application at hand may be built into the model, thereby further improving the result of the tracking of the objects.

The predefined subset of states is a strict subset of the predefined set of states. Further, the predefined subset of states may be a subset of neighbouring states, e.g., states having values which are adjacent to each other according to some norm, such as a L2-norm.

According to some example embodiments, the transition probability may me non-zero only for states in the previous accumulated probability map that are in said predefined subset of states. In this way, the transition probability will become zero for all states outside the predefined subset of states. This will simplify the updating of the object identity map and the accumulated probability map in that fewer evaluations are needed to identify a state in the previous accumulated probability map that gives a maximum value of the above mentioned product of the probability specified in the previous accumulated probability map and the transition probability. In this way, the computational complexity is further reduced.

According to some example embodiments, the transition probability may be the same for each state in the previous accumulated probability map that is in said predefined subset of states. This will further reduce the computational complexity when identifying a state in the previous accumulated probability map that gives a maximum value of the above mentioned product of the probability specified in the previous accumulated probability map and the transition probability. When the non-zero transition probabilities are the same, the state in the predefined subset of states having the largest probability in the previous accumulated probability map may be directly identified as giving rise to the maximum value without having to evaluate any products.

In many applications, it is most likely that an object either retains its state from the previous time point, or moves to a neighbouring state. Therefore, the predefined subset of states may be in a neighbourhood of the state for which the object identity map currently is updated.

A state of an object may typically include a spatial position of the object, i.e., a spatial position of the object in a received image. The predefined set of states may thus include a set of spatial positions that an object may have. The set of spatial positions may correspond to the locations of the pixels in the received image. However, typically, the set of spatial positions is defined with respect to a somewhat coarser spatial grid in the received image. A state may also comprise further information about the object. For example, a state of an object may further include at least one of an orientation of the object, a velocity of the object, an acceleration of the object, a colour of the object, and a texture of the object. The method proposed herein is thus not only limited to tracking the position of a plurality of objects in the image sequence, but it may also track, for instance, an orientation of the object at the same time.

As further described above, information from the received image, in the form of a detection probability map, is used when updating the accumulated probability map. The detection probability map may be calculated from the received image using a convolutional neural network. The received image may thus be input to a convolutional neural network which outputs the desired detection probability map. Once trained, convolutional neural network is an efficient way of obtaining detection probabilities.

As further described above, the predefined set of states may be associated with possible spatial positions of an object in the received images. In more detail, the predefined set of states may be associated with spatial positions which form a two-dimensional grid of spatial positions in the received image. In this way, the method may allow for tracking in two dimensions.

The method is not limited to tracking in two dimensions, but may also be used to for instance track objects which are limited to move along one or more specific paths in the received image. More specifically, the predefined set of states may be associated with spatial positions located along one or more one-dimensional paths in the received image. For example, this may be the case when tracking cars which are restricted to traveling along roads depicted in the received image. An alternative to restricting the spatial positions (the states) to one or more one-dimensional paths in the received image, is to work with a two-dimensional grid of spatial positions and instead limit the transition probabilities described above to be non-zero only for spatial positions being located along on ore more one-dimensional paths. This would, in the end, lead to a comparable tracking method.

The method may further comprise initializing the object identity map and the accumulated probability map prior to receiving the first image in the sequence of images. The initialization may be based on a user input which specifies a start state, such as a start position, for each object. More specifically, the method may further comprise initializing the object identity map and the accumulated probability map prior to receiving a first image in the sequence of images based on an input which specifies a start state in the predefined set of states for each of the plurality of objects.

Once the input has been received, the object identity map and the accumulated probability map may thus be initiated. For example, the object identity map may be initialized to identify each object in its corresponding start state, and the accumulated probability map may be initialized to specify the probability one for each start state corresponding to the plurality of objects and zero elsewhere.

According to a second aspect, a system for tracking a plurality of objects in a sequence of images comprises:

a receiver configured to receive an image from a sequence of images, a calculating component configured to calculate, based on the received image, a detection probability map which, for each state of a predefined set of states of an object, specifies a probability that any of the plurality of objects is detected in that state in the received image, an updating component configured to update, based on the calculated detection probability map, an object identity map and an accumulated probability map recursively from a previous object identity map and a previous accumulated probability map corresponding to a previously received image of the sequence of images, wherein, for each state of the predefined set of states, the object identity map identifies an object which is most likely to be in that state in the received image, and, the accumulated probability map specifies a probability of an object, which is identified in the object identity map for that state, having that state in the receive image, and a tracking component configured to track each object in the received image by finding one or more states for which the object is identified in the updated object identity map, and selecting a state among the found one or more states having a highest probability specified in the updated accumulated probability map.

According to a third aspect, a computer-readable medium has computer code instructions stored thereon adapted to carry out the method according to the first aspect when executed by a device having processing capability.

The second and third aspects may generally have the same features and advantages as the first aspect. It is further noted that the teachings relate to all possible combinations of features unless explicitly stated otherwise.

BRIEF DESCRIPTION OF THE DRAWINGS

The above, as well as additional objects, features and advantages will be better understood through the following illustrative and non-limiting detailed description of preferred embodiments, with reference to the appended drawings, where the same reference numerals will be used for similar elements, wherein:

FIG. 1a schematically illustrates an image of a sequence in which tracking of a plurality of objects may be carried out according to a first scenario.

FIG. 1b schematically illustrates an image of a sequence in which tracking of a plurality of objects may be carried out according to a second scenario.

FIG. 2 schematically illustrates a system for tracking a plurality of objects in a sequence of images according to embodiments.

DETAILED DESCRIPTION OF EMBODIMENTS

Figure 3:
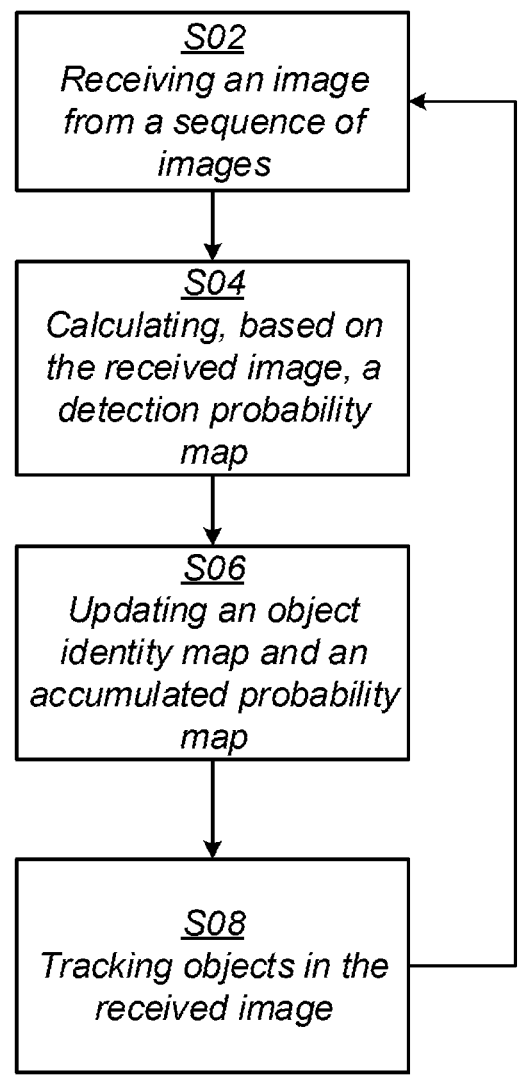
FIG. 3 is a flowchart of a method of tracking a plurality of objects in a sequence of images according to embodiments.

The embodiments will now be described more fully hereinafter with reference to the accompanying drawings, in which embodiments are shown. The systems and devices disclosed herein will be described during operation.

Tracking of a plurality of objects in a video, i.e., in a sequence of images, may be of interest in various applications. For example, a video camera may be used to monitor a number of objects in a room. An image from such an application may schematically look like in FIG. 1a, where three objects, here persons, are imaged from above. In the scenario of FIG. 1a, the objects may move freely in the two dimensions of the image. Another tracking scenario is to monitor traffic, such as cars driving on a road. An image from such a scenario may schematically look like the image shown in FIG. 1b where four objects, here cars, which are passing a road crossing are shown. In the scenario of FIG. 1b, the objects are restricted to move along one or more paths in the image, namely along the roads.

FIG. 2 shows a system 200 which may be used for tracking of a plurality of objects in a sequence of images. For example, the system 200 may be used in the tracking scenarios described with reference to FIGS. 1a and 1b. The system 200 comprises a receiver 202, a calculating component 204, an updating component 206, and a tracking component 208. The receiver 202 is generally arranged to receive a video stream, i.e., a sequence of images, from a video camera. The images in the sequence of images depict the same scene, although at different points in time. The system 200 may in some embodiments be included in the video camera, such that all of the components 202, 204, 206, 208 are included in the video camera. In other embodiments, the system 200 is included in a device which is remote from the video camera, such as in a server. In yet other embodiments, the components 202, 204, 206, 208 may be distributed over several physical devices. For example, the calculating component 204 may have a cloud-based implementation, while the updating component 206, and the tracking component 208 are either located in the video camera or in a server.

The system 200 thus comprises various components 202, 204, 206, 208 which are configured to implement the functionality of the system 200. In particular, each illustrated component corresponds to a functionality of the system 200. Generally, the controller 200 may comprise circuitry which is configured to implement the components 202, 204, 206, 208 and, more specifically, their functionality.

In a hardware implementation, each of the components 202, 204, 206, 208 may correspond to circuitry which is dedicated and specifically designed to provide the functionality of the component. The circuitry may be in the form of one or more integrated circuits, such as one or more application specific integrated circuits. By way of example, the calculating component 204 may thus comprise circuitry which, when in use, calculates a detection probability map as will be described in more detail below.

In a software implementation, the circuitry may instead be in the form of a processor, such as a microprocessor, which in association with computer code instructions stored on a (non-transitory) computer-readable medium, such as a non-volatile memory, causes the system 200 to carry out any method disclosed herein. In that case, the components 202, 204, 206, 208 may thus each correspond to a portion of computer code instructions stored on the computer-readable medium, that, when executed by the processor, causes the system 200 to carry out the functionality of the component.

It is to be understood that it is also possible to have a combination of a hardware and a software implementation, meaning that the functionality of some of the components 202, 204, 206, 208 are implemented in hardware and others in software.

The operation of the system 200 will now be described in more detail with reference to FIG. 4 and the flow chart of FIG. 3.

In step S02, the receiver 202 receives an image from a sequence of images. The images of the sequence depict the same scene albeit at different points in time. FIG. 4 illustrates three consecutive images 402, 404, 406 corresponding to time points t−1, t, and t+1, respectively.

The images 402, 404, 406 each depicts a plurality of objects 408, here illustrated by three objects labelled A, B and C. However, it is to be understood that the method is applicable to any number of objects. In the example of FIG. 4, the objects 408 may move freely in the two dimensions depicted by the images 402, 404, 406, similar to the scenario described with reference to FIG. 1. For example, objects A and B change their positions between images 402, 404, and 406, while object C retains its position between the images 402, 404, 406.

Each object 408 may be in different states $s \in \mathbb{S}$, where $\mathbb{S}$ is a predefined set of discrete states that an object may have. Differently stated, $\mathbb{S}$ is a predefined set of possible states of an object. $\mathbb{S}$ thus defines the state space of an object 408. The state space S itself is the same for all images, i.e., it does not change over time. However, as time passes by, the objects 408 may change states as will be explained in more detail below.

A state s may typically, but not necessarily, include the spatial position of the object 408 in the image. A state may additionally, or alternatively, include one or more of the orientation of the object 408, the velocity of the object 408, the acceleration of the object 408, the colour of the object 408, and the texture of the object 408. If a state only includes spatial position of the object 408, then the state is defined by a value defining the spatial position of the object 408, such as a coordinate (x, y) in the image. If a state relates several properties of the object 408, then the state is defined by a combination of values defining the properties of the object 408 to which the state relates. For example, if the state includes spatial position and orientation of the object, it may be defined by a coordinate (x, y) and an orientation a in the image, i.e., by (x, y, α).

Figure 4:
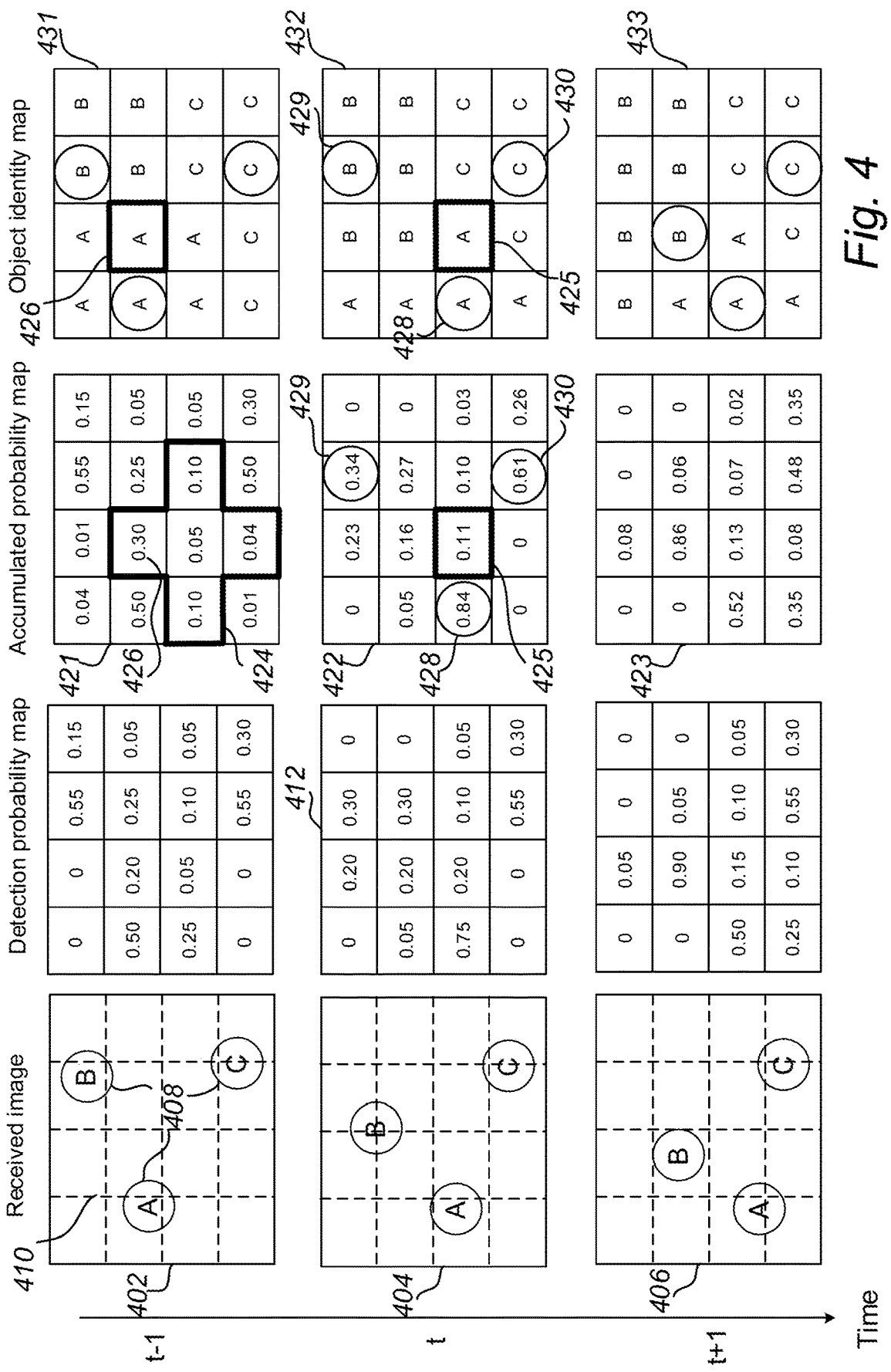
FIG. 4 schematically illustrates steps carried out in order to track a plurality of objects in a sequence of images according to embodiments.

In the example of FIG. 4, it is assumed that the states s include spatial position only. More specifically, in FIG. 4, the predefined set of states $\mathbb{S}$ includes spatial positions which form a two-dimensional grid 410 of spatial positions in the received images 402, 404, 406. This is illustrated by the dashed grid 410 which divides the received images 402, 404, 406 into regions. Here 16 regions are shown, although in practice a much larger number of regions are typically used depending on the application. Each region may correspond to a state, i.e., a spatial position in this example. For example, the coordinates of the center points of each region may define the spatial position of the corresponding state.

If the tracking scenario instead had been a scenario where the objects are restricted to move along certain paths, or in certain regions, of the image, the predefined set of states $\mathbb{S}$ could instead have been defined to only include spatial positions belonging to those paths or those regions.

The state space $\mathbb{S}$ itself is the same for all images, i.e., it does not change over time. However, as time passes by, the objects 408 may change states as will be explained in more detail below.

The method carried out by the system 200 is an iterative method which is carried out for each received image 402, 404, 406 in the sequence of images. Thus, steps S02, S04, S06, S08 shown in FIG. 3 are repeated for each image in the sequence. The following description describes what happens each time an image has been received, using image 404 received at time t as an example.

In step S04, the calculating component 204 calculates, based on the received image 404, a detection probability map 412. The detection probability map 412 is defined with respect to the predefined set of states $\mathbb{S}$. The probability map 412 specifies a probability $d_{s,t}$ of an object 408 being detected in each possible state $s \in \mathbb{S}$ in the image 404 received at time t. Exemplifying values of the detection probabilities $d_{s,t}$ are shown in the detection probability map 412.

In order to calculate the detection probability map 412, the calculating component 204 may comprise a convolutional neural network specifically trained for this purpose. In other words, the received image 404 may be input to a convolutional neural network which calculates and outputs the detection probability map 412. For example, the convolutional neural network described in section 4.2 of Ardö et al, "A CNN-based Cow Interaction Watchdog", IET Computer Vision, DOI: 10.1049/iet-cvi.2017.0077, and incorporated herein by reference, may be used for this purpose.

For each state $s \in \mathbb{S}$, the updating component 206 maintains $o_{s,t}$ which is the identity of the object that is currently (at time t) most likely to have the state s, and $p_{s,t}$ which is the probability that the object $o_{s,t}$ has state s in the image received at time t. At each point in time, the updating component 206 stores the object identities $o_{s,t}$ for each state in a map, referred to herein as an object identity map, and the probabilities $p_{s,t}$ for each state in a map referred to herein as the accumulated probability map. An object identity map is hence associated with a point in time and is defined with respect to all states. For each state in the object identity map, the object $o_{s,t}$ is specified. Similarly, the accumulated probability map is associated with a point in time and is defined with respect to all states. For each state in the accumulated probability map, the probability $p_{s,t}$ is specified. The object identity map and the accumulated probability map are related in that, for each state, the probability specified in the accumulated probability map relates to the object identified in the object identity map.

FIG. 4 shows three object identity maps 431, 432, 433 corresponding to time points t−1, t, and t+1, respectively. Using the above notation, the object identity map 431 corresponding to time t−1 thus includes object identities $o_{s,t-1}$, $s \in \mathbb{S}$, the object identity map 432 corresponding to time t includes object identities $o_{s,t}$, $s \in \mathbb{S}$, and object identity map 432 corresponding to time t+1 includes object identities $o_{s,t+1}$, $s \in \mathbb{S}$. Further, FIG. 4 shows three accumulated probability maps 421, 422, 423 corresponding to time points t−1, t, and t+1, respectively. Using the above notation, the accumulated probability map 421 corresponding to time t−1 thus includes probabilities $p_{s,t-1}$, $s \in \mathbb{S}$, the accumulated probability map 422 corresponding to time t includes probabilities $p_{s,t}$, $s \in \mathbb{S}$, and the accumulated probability identity map 423 corresponding to time t+1 includes probabilities $p_{s,t+1}$, $s \in \mathbb{S}$. It is to be understood that although shown separately in FIG. 4, the object identity map and the accumulated probability map may be stored within a common data structure.

The updating component 206 updates, in step S06, the object identity map and the accumulated probability map. In more detail, the updating component 206 recursively updates the object identities $o_{s,t}$ in the object identity map 432 and the associated probabilities $p_{s,t}$ in the accumulated probability map 422 at time t by assuming that the object identities $o_{s,t-1}$ of the object identity map 431 and the associated probabilities $p_{s,t-1}$ of the accumulated probability map 421 at time t−1 are known. In other words, the updating component 206 recursively calculates the object identity map 432 and the accumulated probability map 422 from the previous object identity map 431 and the previous accumulated probability map 421.

In order to perform the updating, the updating component 206 may for each state s calculate a most likely previous state $e_s$ according to $$e_s = \operatorname*{argmax}_{\hat{s}} p_{\hat{s}, t-1} p(s \mid \hat{s}), \qquad \text{(Equation 1)}$$

where p(s|ŝ) is a transition probability which describes the probability of an object moving from state ŝ at time t−1 to state s at time t. Expressed in words, the updating component 206 may thus, for each state s, identify a state $e_s$ in the previous accumulated probability map 431 that gives rise to a maximum value of the product of the probability specified in the previous accumulated probability map 431 and the transition probability. For computational efficiency, it may be preferred to work on a logarithmic scale and instead of directly calculating the product, calculating a sum of logarithms of the involved probabilities instead.

The transition probabilities may be predefined and represent prior knowledge of how an object may move from one image to the next. The transition probabilities may thus be said to define a probabilistic motion model. A typical motion model may assign higher probabilities to move from a certain subset of states at time t−1 to state s at time t compared to moving from states outside the certain subset of states at time t−1 to state s at time t. For example, only states in the certain subset of states may be associated with a non-zero probability. In certain cases, the predefined subset of states may define a subset of neighbouring states. In particular, the predefined subset of states may be defined as those states which are in a neighbourhood of the state s which is currently evaluated, meaning that objects are more likely to retain its state or move to a neighbouring state than to a state which is further away. The transition probabilities may differ between different states. For example, the size of the predefined subset of states may differ depending on the target state s at time t. In this way, one may, e.g., take into account that objects may move differently in different parts of the image.

In the example of FIG. 4, the motion model assumes that objects either retain their position or move to a nearest neighbouring state. This is indicated by the neighbourhood 424 in the accumulated probability map 421 at time t−1 showing those states which have a non-zero probability of moving to state 425 at time t. For the sake of illustration, it will further be assumed that the transition probabilities are the same for all states in the neighbourhood 424. However, it is to be understood that the size and shape of the neighbourhood can be chosen differently depending on the application. Also, it is to be understood that the transition probabilities can be selected differently within the neighbourhood depending on prior knowledge of how the objects tend to move.

Further, in a different tracking scenario, such as that shown in FIG. 1b, it may be more likely that the objects move further away between two images, and it may be appropriate to select a predefined subset of states at time t−1 which is centered around a state which is at a distance from the state s which is currently evaluated. In the scenario of FIG. 1b, the distance could, for instance, be selected based on the average speed and direction of the objects.

In some embodiments, the transition probabilities are not predefined but may instead adaptively be estimated from the image data of the images in sequence. In this way, the transition probabilities become time dependent. For example, based on two subsequent images in the sequence, the transitions probabilities may be estimated for each state in the accumulated probability map. Thus, the transition probabilities used in Equation 1 for moving from a state at time t−1 to a state at time t may be estimated from the image 402 captured at time t−1 and the image 404 captured at time t. This may, for instance, be achieved by estimating optical flows between the two subsequent images, or by using a convolutional neural network specifically trained for this purpose.

Returning to the calculation of the most likely previous state $e_s$, the most likely previous state of state 425 in the accumulated probability map 422 at time t is state 426 in the accumulated probability map 421 at time t−1. This follows since, with equal transition probabilities in the neighbourhood 424, the state in the neighbourhood 424 having the highest value in the accumulated probability map will maximize the product of Equation 1.

Once the most likely previous state $e_s$ has been identified, the object identity $o_{s,t}$ for each state may be updated according to $$o_{s,t} = o_{e_s, t-1}.$$ (Equation 2)

In other words, the updating component 206 may update the object identity map 432, for state s, to identify the same object as was identified by the previous object identity map 431 for the most likely previous state $e_s$. To exemplify, the object identity map 432 at time t will for state 425 identify the same object as was identified for the most likely previous state 426 by the object identity map 431 at time t−1. The update is carried out for each state and the result is stored in object identity map 432.

To update the accumulated probability map, updating component 206 make use of the detection probabilities $d_{s,t}$ of the detection probability map 412 at time t. In more detail, the updating component 206 may for each state s propagate the probabilities of the accumulated probability map 421 of time t−1 by calculating the following product:

$$\tilde{p}_{s,t} = d_{s,t} p_{e_s, t-1} p(s|e_s).$$ (Equation 3)

In other words, the updating component 206 may calculate a product of the transition probability for moving from the most likely previous state $e_s$ to state s, the probability specified in the accumulated probability map 421 for the most likely previous state $e_s$ at time t−1, and the probability specified in the detection probability map 412 at time t. The rationale is that the probability $p_{e_s, t-1}$ from the accumulated probability map 412 specifies the likelihood of the object which was most likely to be in state $e_s$ to actually be in state $e_s$. The transition probability then specifies how likely the object was to move from state $e_s$ to state s, and the detection probability from the detection probability map 412 specifies the probability of an object being detected in state s. Notably, the product of $p_{e_s, t-1} p(s|e_s)$ correspond to the maximum value found when evaluating Equation 1. Also in this case, for computational efficiency, it may be preferred to work on a logarithmic scale and instead of calculating the product in Equation 3, calculating a sum of logarithms of the involved probabilities instead. However, in order to perform the normalization described next, the result needs to be transformed back again from the logarithmic scale.

The propagated probabilities $\tilde{p}_{s,t}$ of Equation 3 will no longer sum to one. By assuming that the object to which a propagated probability relates has a state which is one of the states for which it is currently the most likely object as indicated in the updated object identity map 432, a probability distribution can be formed by normalizing the propagated probability according to:

$$p_{s,t} = \frac{\tilde{p}_{s,t}}{\sum_{\hat{s} | o_{\hat{s},t} = o_{s,t}} \tilde{p}_{\hat{s},t}}.$$ (Equation 4)

In other words, the propagated probability $\tilde{p}_{s,t}$ is associated with an object, namely the object identified for state s in the updated object identity map 432. The propagated probability $\tilde{p}_{s,t}$ is thus normalized over states which are identified as being associated with that same object by the updated object identity map 432. To exemplify, object A is the most likely object for state 425 at time t according to the object identity map 432. When performing the normalization of the propagated probability $\tilde{p}_{s,t}$ for state 425, the normalization will thus be performed with respect to all states for which object A is identified in the object identity map 432.

In step S08, the tracking component 208 proceeds to track each object 408 in the received image 404. When tracking each object 408, the current state of each object is estimated. In order to so, the tracking component 208 finds all states in the updated object identity map 432 for which the object is identified. Then the tracking component 208 proceeds to select the state among the found states having a highest probability specified in the updated accumulated probability map 422. Expressed differently, the current state $s_o$ of each object o at time t may be estimated as:

$$s_o = \underset{\tilde{s}|o_{\tilde{s},t}=o}{\mathrm{argmax}} p_{\tilde{s},t}. \quad \text{(Equation 5)}$$

To exemplify, the current state of object A at time t would hence be estimated to be state 428, since the corresponding probability in the accumulated probability map is highest among the probabilities in the accumulated probability map which are associated with object A. Similarly, the current state of object B at time t would hence be estimated to be state 429 at time t and the current state of object C at time t would hence be estimated to be state 430 at time t. Accordingly, from time t−1 to time t, the method has tracked a downwards change in the position of object A, while objects C and B were estimated to have retained their positions.

Steps S02, S04, S06, and S08 may then be repeated as a new image 406 is received. As illustrated in FIG. 4, going from time t to t+1, the method tracks a change in position of object B, while objects A and C are estimated to retain their positions. The estimated state of each object at each point in time may be used to form a trajectory, i.e., a track, of the objects change in states over time. In FIG. 4, the estimated state of each object at each time point are indicated by circles in the object identity maps 431, 432, 433.

Prior to receiving the first image in the sequence, the object identity map and the accumulated probability map may be initialized, e.g., by the updating component 206. The initialization may be based on an input which specifies a start state of each of the objects. The start state may, e.g., be deduced by a user looking at the first image in the sequence and manually indicating the start states of the objects. Based on such an input, the accumulated probability map may be initialized to specify a probability of one for each state being indicated as a start state for an object and zero for all other states. The object identity map may be initialized to identify each object in its corresponding start state. The remaining states in the object identity map (which will be associated with a zero probability in the accumulated probability map) may be left empty or may be initialized with any of the objects. The object identity map will anyway successively be filled in by the method as more non-zero probabilities appears in the accumulated probability map.

An alternative approach to initialization is to set a unique object identity for each state in the object identity map and to set all values in the accumulated probability map to the same value, such as equal to one. Then steps S02, S04, S06 of the method described above may be applied to the first images of the sequence, albeit without performing the normalization step described in connection to Equation 4 above. This will cause the superfluous object identities to be outcompeted after a while and only the object identities of the objects which are present in the scene will remain. Steps S02, S04, S06 may, for instance, be repeated until the number of object identities in the object identity map corresponds to the number of objects that are known to be present in the scene.

The above method and system may also handle the situation where objects enter into the images and objects leave the images. For example, the sequence of images may depict a scene, such as a room, where objects may enter and leave through one or more doors. In such a situation, the objects may be provided with an identification tag, such as an RFID tag, which is registered as the objects enter the room through a door and when they, after a while, leave the room through the same or another door. As an object is registered to have entered the room, the object identity map may be updated to identify a new object for the state that is closest to the door through which the object entered. At the same time, the accumulated probability map may be updated to specify the probability one for that state. Similarly, as an object is registered to have left the room through a door, the object identity map may be updated to remove the object identified in the object identity map for the state which is closest to the door where the object left. The accumulated probability map may be updated to specify the probability zero for those states that are associated with the object that has left.

It will be appreciated that a person skilled in the art can modify the above-described embodiments in many ways and still use the advantages as shown in the embodiments above. Thus, the claims should not be limited to the shown embodiments but should only be defined by the appended claims. Additionally, as the skilled person understands, the shown embodiments may be combined.

The invention claimed is:

1. A method of tracking a plurality of objects in a sequence of images, comprising:
  receiving an image from a sequence of images,
  calculating, based on the received image, a detection probability map which, for each state of a predefined set of states of an object, specifies a probability that any of the plurality of objects is detected in that state in the received image,
  updating, based on the calculated detection probability map, an object identity map and an accumulated probability map recursively from a previous object identity map and a previous accumulated probability map corresponding to a previously received image of the sequence of images,
  wherein, for each state of the predefined set of states, the object identity map identifies an object which is most likely to be in that state in the received image, and, the accumulated probability map specifies a probability of an object, which is identified in the object identity map for that state, having that state in the received image, and
  tracking each object in the received image based on the updated object identity map and the accumulated probability map.

2. The method of claim 1, wherein, for at least one image in the sequence of images, each object in the image is tracked based on the updated object identity map and the accumulated probability map by finding one or more states for which the object is identified in the updated object identity map, and selecting a state among the found one or more states having a highest probability specified in the updated accumulated probability map.

3. The method of claim 1 wherein the object identity map is updated for each state of the predefined set of states by:
identifying a state in the previous accumulated probability map that gives a maximum value of a product of the probability specified in the previous accumulated probability map and a transition probability,
wherein the transition probability defines a probability of an object moving from the state in the previous accumulated probability map to the state for which the object identity map currently is updated, and
updating the object identity map to identify the same object as the object identified by the previous object identity map for the identified state.

4. The method of claim 3, wherein the accumulated probability map is updated by:
for each state of the predefined set of states, calculating a product of said maximum value and a probability specified by the detection probability map for that state, and
normalizing the so formed products over states which are identified as being associated with the same object by the updated object identity map.

5. The method of claim 3, wherein the transition probability is higher for states in the previous accumulated probability map which are within a predefined subset of states compared to states which are outside of said predefined subset of states.

6. The method of claim 5, wherein the transition probability is non-zero only for states in the previous accumulated probability map that are in said predefined subset of states.

7. The method of claim 6, wherein the transition probability is the same for each state in the previous accumulated probability map that is in said predefined subset of states.

8. The method of claim 5, wherein states of the predefined subset of states are in a neighbourhood of the state for which the object identity map currently is updated.

9. The method of claim 1, wherein a state of an object includes a spatial position of the object and, optionally, at least one of an orientation of the object, a velocity of the object, an acceleration of the object, a colour of the object, a texture of the object.

10. The method of claim 1, wherein the detection probability map is calculated from the received image using a convolutional neural network.

11. The method of claim 1, wherein the predefined set of states is associated with spatial positions which form a two-dimensional grid of spatial positions in the received image.

12. The method of claim 1, wherein the predefined set of states is associated with spatial positions located along one or more one-dimensional paths in the received image.

13. The method of claim 1, further comprising:
initializing the object identity map and the accumulated probability map prior to receiving a first image in the sequence of images based on an input which specifies a start state in the predefined set of states for each of the plurality of objects.

14. A system for tracking a plurality of objects in a sequence of images comprising:
a receiver configured to receive an image from a sequence of images,
a calculating component configured to calculate, based on the received image, a detection probability map which, for each state of a predefined set of states of an object, specifies a probability that any of the plurality of objects is detected in that state in the received image,
an updating component configured to update, based on the calculated detection probability map, an object identity map and an accumulated probability map recursively from a previous object identity map and a previous accumulated probability map corresponding to a previously received image of the sequence of images,
wherein, for each state of the predefined set of states, the object identity map identifies an object which is most likely to be in that state in the received image, and, the accumulated probability map specifies a probability of an object, which is identified in the object identity map for that state, having that state in the received image, and
a tracking component configured to track each object in the received image based on the updated object identity map and the accumulated probability map.

15. A non-transitory computer-readable medium having computer code instructions stored thereon adapted to carry out the method according to claim 1 when executed by a device having processing capability.

* * * * *